(12) United States Patent
Matson

(10) Patent No.: US 9,879,820 B2
(45) Date of Patent: Jan. 30, 2018

(54) HOLDER FOR MULTIPLE EYEGLASSES

(71) Applicant: Marc Matson, Huntington Beach, CA (US)

(72) Inventor: Marc Matson, Huntington Beach, CA (US)

(*) Notice: Subject to any disclaimer, the term of this patent is extended or adjusted under 35 U.S.C. 154(b) by 43 days.

(21) Appl. No.: 15/086,486

(22) Filed: Mar. 31, 2016

(65) Prior Publication Data

US 2017/0284593 A1    Oct. 5, 2017

(51) Int. Cl.
*F16L 3/22*      (2006.01)
*F16M 13/02*    (2006.01)
*B60R 7/00*     (2006.01)

(52) U.S. Cl.
CPC ............ *F16M 13/02* (2013.01); *B60R 7/00* (2013.01)

(58) Field of Classification Search
CPC ................................ F16M 13/02; B60R 7/00
USPC .................................... 248/68.1, 902; 24/3.3
See application file for complete search history.

(56) References Cited

U.S. PATENT DOCUMENTS

| | | | |
|---|---|---|---|
| 851,327 A * | 4/1907 | Thompson | A41F 15/02 24/363 |
| 2,969,140 A * | 1/1961 | Avetta | A45D 27/29 206/349 |
| D209,329 S * | 11/1967 | Cleat | D8/382 |
| 4,239,167 A * | 12/1980 | Lane | A45C 11/04 248/205.3 |
| D287,916 S * | 1/1987 | DelGarbino | D6/567 |
| 5,046,696 A * | 9/1991 | Lee | A47F 7/021 248/205.3 |
| 5,319,838 A * | 6/1994 | Eppenauer | A44C 1/00 24/13 |
| D364,770 S * | 12/1995 | Stiles | D6/567 |
| 6,360,051 B1 * | 3/2002 | Daoud | G02B 6/3801 385/134 |
| 6,872,027 B2 * | 3/2005 | Ledingham | F16B 2/065 248/68.1 |
| D512,905 S * | 12/2005 | Byers | D8/382 |
| 2007/0120023 A1 * | 5/2007 | Martinez | E02F 9/2275 248/75 |
| 2008/0148528 A1 * | 6/2008 | Jones | A44C 3/001 24/3.3 |

FOREIGN PATENT DOCUMENTS

| | | | | |
|---|---|---|---|---|
| EP | 0839467 A1 * | 5/1998 | | A45C 11/04 |
| JP | 07083215 A * | 3/1995 | | |

* cited by examiner

*Primary Examiner* — Kimberly T Wood
(74) *Attorney, Agent, or Firm* — Usha S. Koshy

(57) ABSTRACT

An eyeglass holder device for holding multiple eyeglasses of a variety of kinds, reading glasses, sunglasses, or protective eyewear type glasses used in a workshop, machine shop, laboratory, or other such work spaces. The eyeglass holder of the invention has a substantially crescent shaped front body portion having a plurality of flexible and thin substantially concave shaped rib structures attached to the inside surface of the front body structure creating the necessary voids to facilitate hanging the eyeglasses on the holder. An important function of the flexible rib structures is to deflect and exert tension on the eyeglasses and hold them stable within the voids to prevent them from moving around and getting damaged. The rectangular shaped back of the eyeglass holder has a recessed back side that accommodates a double sided adhesive tape to mount the holder on to a suitable surface.

7 Claims, 6 Drawing Sheets

HOLDER FOR MULTIPLE EYEGLASSES

FIELD OF THE INVENTION

This invention is generally related to holders for personal accessories. More particularly, the invention is related to holders for eyeglasses and in particular holders for multiple eyeglasses.

BACKGROUND OF THE INVENTION

Eyeglasses are a critical personal accessory for those who require them and depend on them to see objects in their surroundings more clearly, read print material and engage in other activities requiring a sharp and clear vision. The common practice among eyeglass users is to store their eyeglasses in eyeglass cases when they are not in use and carry those cases on one's person, in a handbag, in the glove compartment of a vehicle etc. These means of transporting eyeglasses in their cases involve the cumbersome and time consuming task of retrieving the eyeglasses from their cases when needed. The other drawback in storing eyeglasses in a case is the tendency to misplace the case and not be able to access and use the eyeglasses when needed.

The need for easy access to eyeglasses especially when engaged in certain activities such as driving, playing sports, working in a laboratory, in a workshop and other such places has spawned an industry for eyeglass holders to store eyeglasses when not needed during the activities and to be able to retrieve them as needed during and after the activities. Prior art have described the use of holders for eyeglasses on a person's clothing (U.S. Pat. Nos. 8,739,368, 7,584,527), in spaces such as the interior of a vehicle (U.S. Pat. Nos. 5,810,310, 5,613,661), wall mountable holders (U.S. Pat. Nos. 4,779,829, 4,239,167). The eyeglass holders described in these prior art are mainly configured to hold a single pair of eye glasses. In work spaces such as a laboratory or a workshop which employ multiple eyeglass users, the use of these single use eyeglass holders are not pragmatic. Such work places require eyeglass holders that can hold multiple eyeglasses of the workers in that workspace at a given time. Further, in a workshop, machine shop, or a laboratory, certain activities require wearing protective eyeglasses to shield the eyes from harsh chemicals as in a laboratory, or to prevent debris and/or sharp objects from hitting the eyes in a machine or other workshop. In such workspaces, besides holders for multiple personal eyeglasses, there is a need for holders that can also hold multiple protective eyewear. Accordingly, there is a need in the prior art for an eyeglass holder that can hold multiple eyeglasses, both personal eyeglasses and protective eyewear for use in work environments employing multiple eyeglass users.

The eyeglass holder of the present invention is configured to hold multiple eyeglasses of a variety of kinds, both personal eyeglasses and protective eyewear when working in environments requiring such eyewear.

SUMMARY OF THE INVENTION

The present invention is an eyeglass holder that has the capacity to hold multiple eyeglasses whether they be personal reading glasses, sunglasses, or protective eyewear type eyeglasses. The eyeglass holder of the invention can be easily mounted to a wall or other work surface in a workshop, laboratory, or other such work spaces where the workers may periodically need to remove their personal eyeglasses and/or protective eye wear and have them held in a secure manner for a period of time before accessing them again for use. The eyeglass holder of the invention can also be mounted on a wall at home, in a closet, or other rooms to hold multiple eyeglasses of the person or family members.

An object of the present invention is to provide an eyeglass holder that can hold multiple eye glasses and/or protective eye wear.

Yet another object of the present invention is to provide an eyeglass holder that can be mounted on a wall or other surface without drilling holes in those walls or other surfaces using screwdrivers or hammers and depending on nails and/or screws to affix and mount the holder to the surface.

A further object of the present invention is to provide an eyeglass holder that can be easily removed from the surface on which it is mounted without leaving any damage to the surface.

The eyeglass holder of the present invention has a substantially crescent shaped front body portion having multiple, flexible, rib structures projecting from the inside surface of the crescent shaped front body portion creating the necessary voids to facilitate hanging the eyeglasses on the holder between the ribs. The rib structures also function to exert tension on the eyeglasses and hold them in place on the eyeglass holder.

In the exemplary embodiment of the eyeglass holder of the present invention, the rectangular shaped flat, plate-like back comprising the holder has a recessed back end that accommodates a double sided tape with a protective layer that can be peeled off to expose the sticky adhesive side which can be pressed on to any smooth surface such as a wall, or any other suitable surface to hang the eyeglass holder.

In the exemplary embodiment of the eyeglass holder of the present invention, there are at least six rib structures within the body of the holder creating the necessary voids to facilitate holding at least eight pairs of eyeglasses on the holder. The inclusion of additional rib structures within the body of the eyeglass holder to create more voids within the holder to facilitate holding several additional eyeglasses and/or protective eye wear is envisioned for the holder and is within the scope of the invention.

In the exemplary embodiment of the eyeglass holder of the invention, the holder is a plastic injection molded single piece device configured with the flexible rib structures within the body of the device and a recessed rectangular back accommodating a double sided tape or adhesive to facilitate mounting the device on any surface.

The foregoing summary of the present invention and its embodiments should not be construed to limit the scope of the invention. In this summary of the invention and in the specification in general references to the embodiments of the invention as, "the exemplary embodiment," and all such related references to embodiments of the invention do not necessarily refer to the same embodiment (s). Rather, these references to the various embodiments in general mean that a particular feature, structure, or characteristic described in conjunction with an embodiment is included in at least some embodiments, but not necessarily all embodiments of the invention. The objects, embodiments, and features of the present invention as described in this summary of the invention will be further appreciated and will become obvious to one skilled in the art when viewed in conjunction with the accompanying drawings, detailed description of the invention, and the appended claims.

DETAILED DESCRIPTION OF THE INVENTION

The present invention is an eyeglass holder for holding multiple eyeglasses and other eyewear in any environment whether on a wall inside a house, inside a closet, a workshop, the inside of a motor vehicle, boat, or any other place where there is a need to hang eyeglasses and keep them safe from being broken or damaged. Besides prescription eyeglasses and sun glasses, the eyeglass holder of the present invention is also configured to hold protective eyewear in a workshop. Machine shop, or a laboratory where it is a practice to wear such glasses to prevent debris, objects and chemicals from entering and/or hitting the eyes during the course of work.

Figure 1:
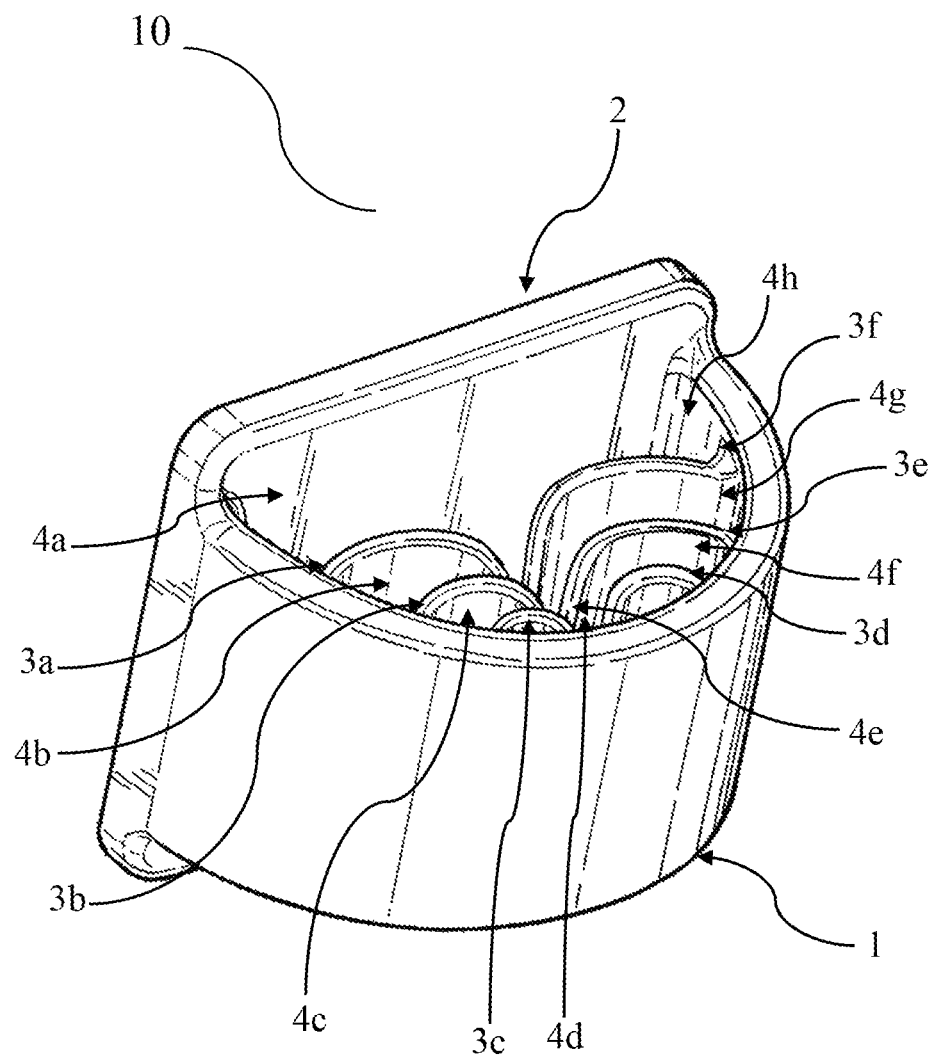
FIG. 1 is a perspective front view of the eyeglass holder of the present invention.

Referring now to the Figures wherein like numerals represent like elements in the various views presented and referring in particular to FIG. 1 which shows a perspective view of the eyeglass holder 10 of the present invention, the eyeglass holder 10 is configured with a substantially crescent shaped front body structure 1 forming the arm of the holder 10 from which the eyeglasses can be suspended and held in place on the holder 10. The crescent shaped front body structure 1 is injection-molded to a back rectangular shaped flat plate-like structure 2 having a recessed back (not seen in this view) that accommodates a double sided adhesive tape or other adhesive to mount the holder to a wall or other surfaces. Referring again to FIG. 1 there is shown a set of ribs 3a, 3b, 3c, 3d, 3e and 3f attached to the inside surface of the crescent shaped front body structure 1 of the eyeglass holder 10 and a set of voids 4a, 4b, 4c, 4d, 4e, 4f, 4g and 4h formed and spaced between the ribs, 3a, 3b, 3c, 3d, 3e and 3f and the two inside ends of the back rectangular shaped flat plate-like structure 2. The voids on either side of each rib and the inside ends of the back rectangular shaped flat plate-like structure 2 allow for the insertion of the temple bars of the eyeglasses into the voids between the ribs so that the temple bars are suspended vertically through the voids inside the front body structure 1 with the frame ends of the temple bars draped over the arm formed by the front body structure 1 of the holder 10 and the ophthalmic frame of the eyeglasses holding the lenses are suspended from the front of the aim formed by the crescent shaped front body structure 1. The ribs 3a, 3b, 3c, 3d, 3e and 3f are thin and flexible and have a generally concave-shaped structure. They are meant to deflect and exert tension on the eyeglasses to keep the eyeglass temples stable within the voids 4a, 4b, 4c, 4d, 4e, 4f, 4g and 4h and prevent the eyeglasses from moving around and getting damaged. The ribs are of different lengths progressing from short length ribs at the front of the holder to large length ribs towards the back of the holder creating different sizes of voids to hold different sizes of eyeglasses. The lengthy single void formed from the combination of the 4a and 4h voids in the back of the holder is large enough to accommodate a single pair of glasses with a large frame. In other embodiments, having additional ribs and the voids between them allows for yet more numbers of eyeglasses to be hung from the holder 10.

Figure 2:
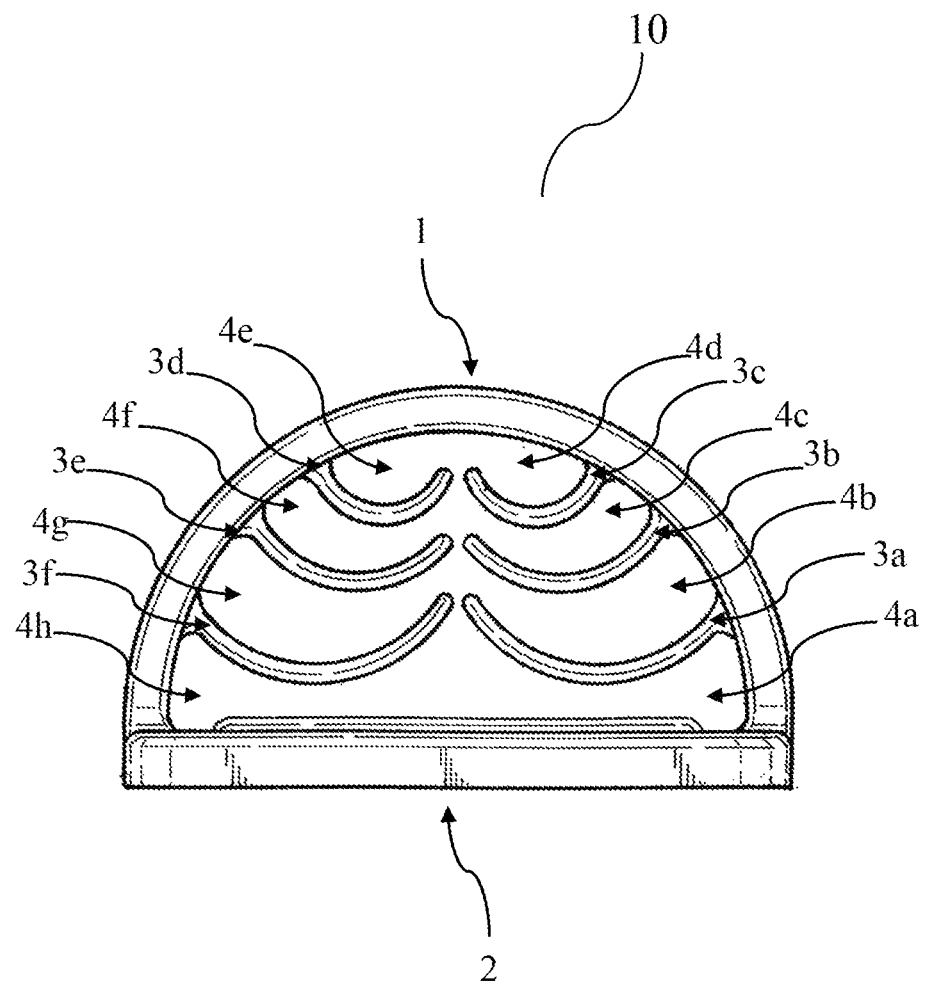
FIG. 2 is a top plan view of the eyeglass holder.

Referring now to FIG. 2 a top plan view of the eyeglass holder 10 of the invention is shown illustrating the substantially crescent shaped front body structure 1 forming the arm of the holder 10 from which the eyeglasses can be suspended when the frame ends of the temples of the eyeglasses are inserted over the arm formed by the crescent shaped front body structure 1 of the holder 10 and into the one of either voids 4a, 4b, 4c, 4d, 4e, 4f, 4g and 4h formed between the ribs 3a, 3b, 3c, 3d. 3e and 3f. The smaller voids 4d and 4e formed between the inside of the front body structure 1 and the ribs 3c and 3d would be used for small framed eyeglasses such as reading glasses. The rest of the ribs and voids could hold progressively larger framed eyeglasses hanging from either side of the front body 1 with the last voids 4a and 4h forming a common channel capable of holding a very large frame eyeglass occupying the entire space in the back side of the holder 10.

Figure 3:
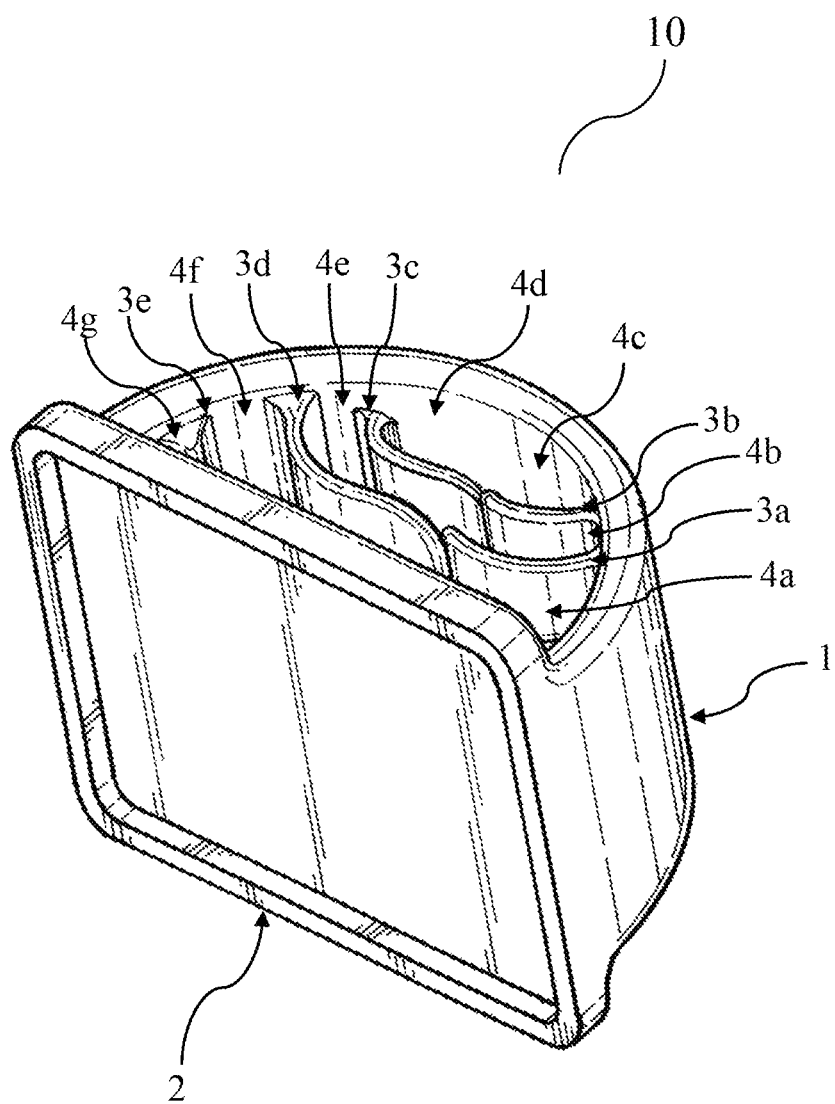
FIG. 3 is another perspective view from the back of the eyeglass holder of the present invention.

FIG. 3 provides a perspective view of the back rectangular shaped flat plate-like structure 2 of the holder 10 configured with a recessed back to accommodate a double sided tape or adhesive to mount the holder to a wall, or other surfaces. The figure also shows a view from the back side 2 of the holder 10 of the several ribs 3a, 3b, 3c, 3d and 3e and the voids 4a, 4b, 4c, 4d, 4e, 4f and 4g.

Figure 4:
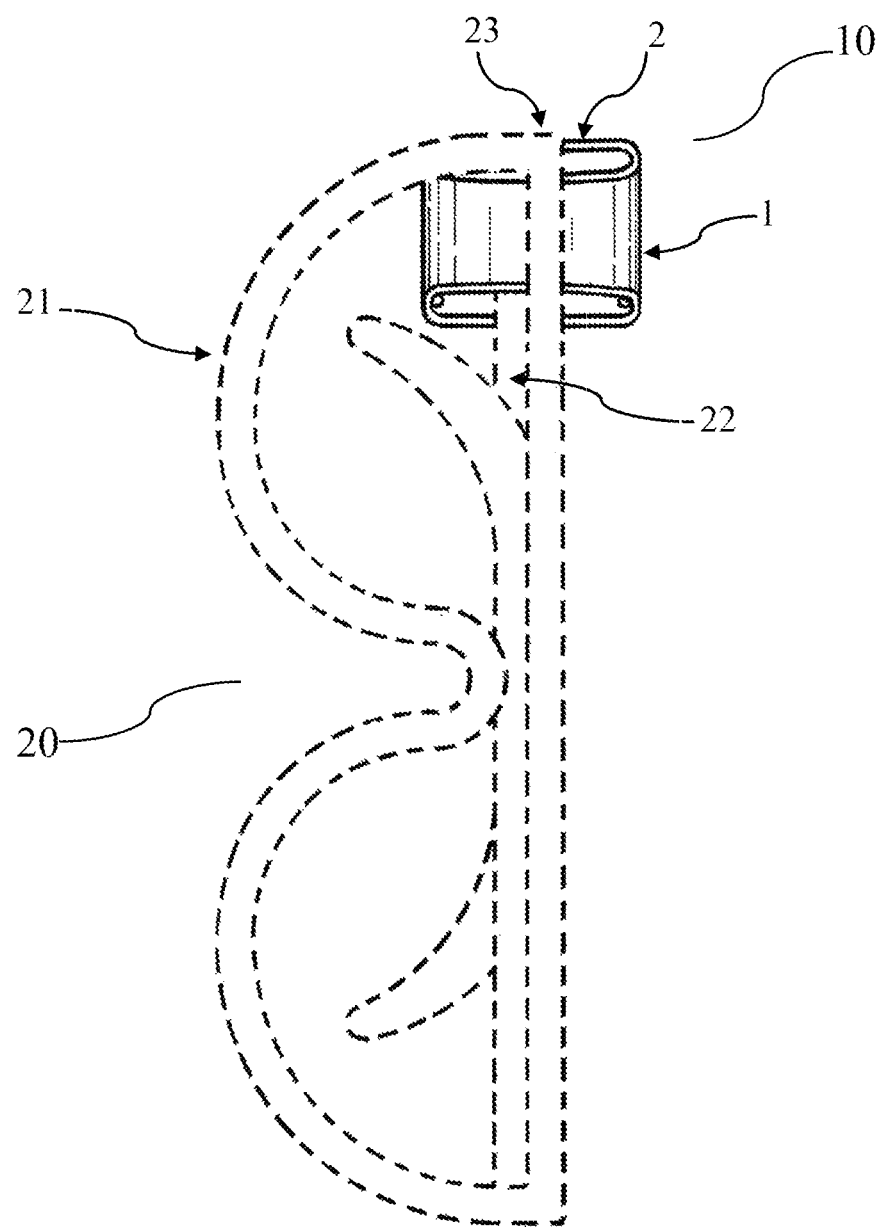
FIG. 4 is a perspective view from the front of the eyeglass holder of the invention illustrating the manner in which an eyeglass is held on the eyeglass holder.

FIG. 4 is a perspective view from the front of the eyeglass holder 10 of the invention illustrating the manner in which an eyeglass 20 having an ophthalmic lens frame 21 and a temple 22 is held on the eyeglass holder 10. The frame end 23 of temple 22 of the eyeglass 20 is inserted over the arm formed by the crescent shaped front body structure 1 of the holder 10 into one of the voids (not shown here) formed on the inside of the holder 10 between the ribs within the holder 10.

Figure 5:
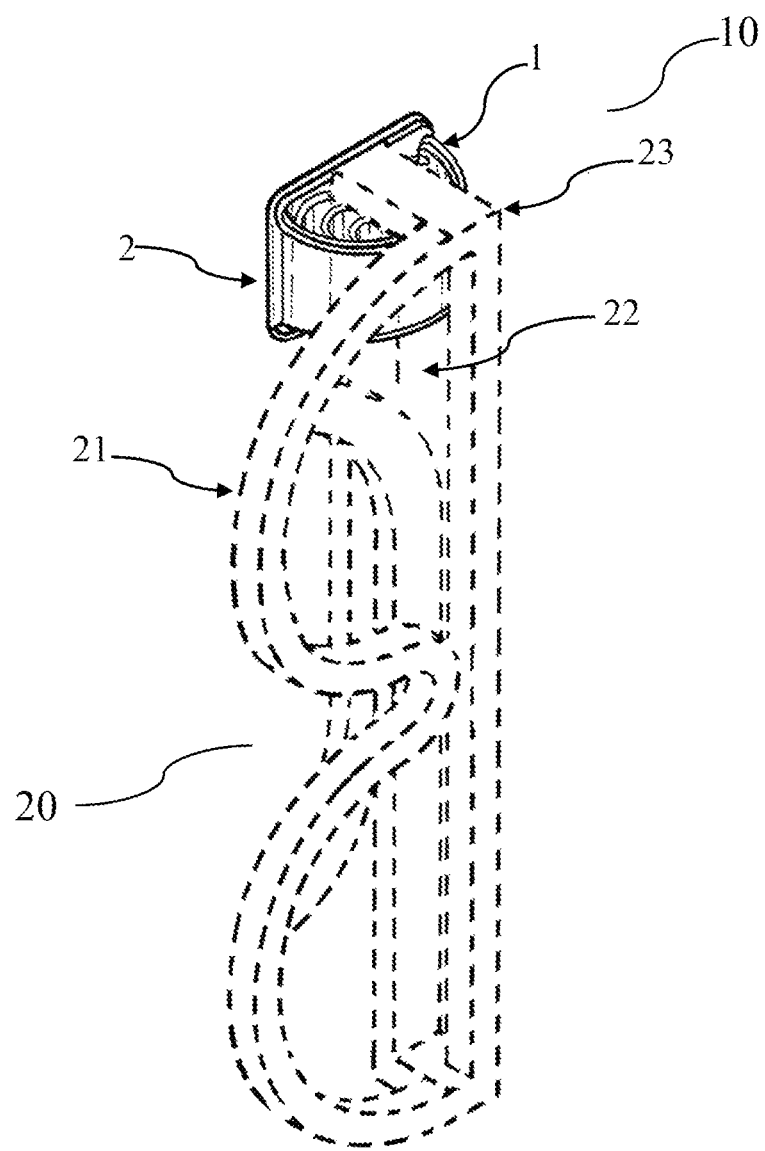
FIG. 5 is another perspective view from an angle showing an eyeglass held in the eyeglass holder of the present invention.

FIG. 5 is another perspective view seen from an angle showing an eyeglass 20 having an ophthalmic lens frame 21 and a temple 22 held in the eyeglass holder 10 of the present invention. In this figure, the frame end 23 of temple 22 of the eyeglass 20 is seen inserted through a void created between the ribs on the inside of the front body structure 1 and the ophthalmic lens frame of the eyeglass 20 suspended in front of the holder 10.

Figure 6:
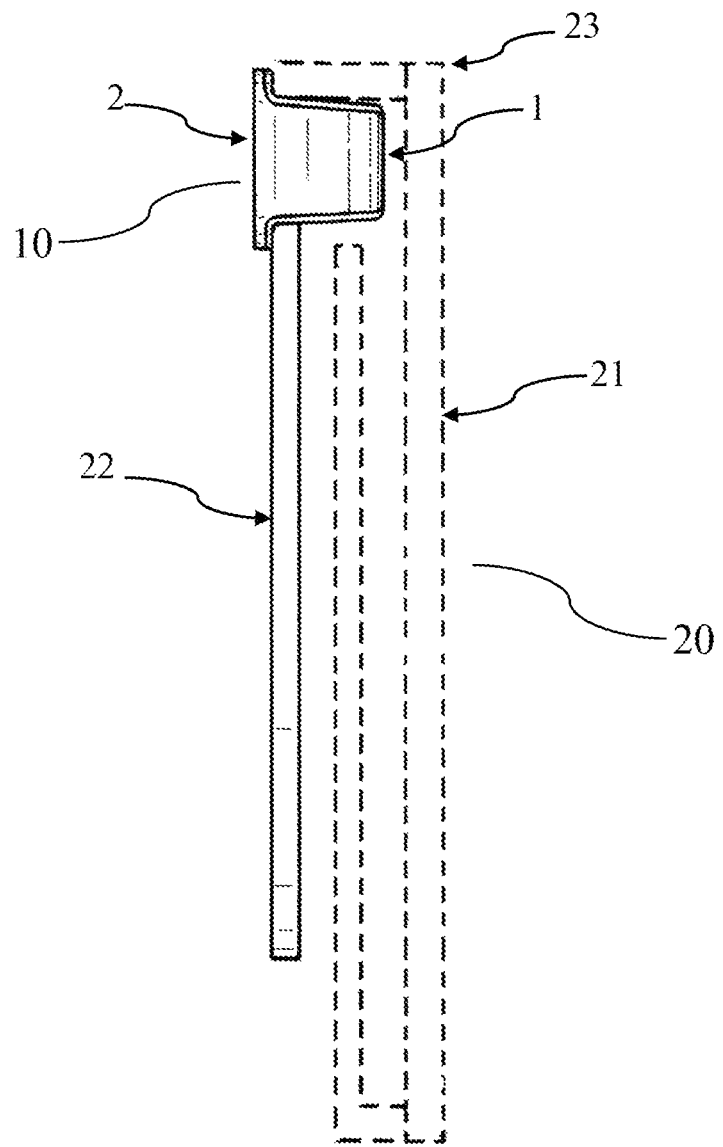
FIG. 6 is a side view of the eyeglass holder of the invention with a rudimentary structure of an eyeglass hanging from the eyeglass holder.

FIG. 6 is a view from the side of the eyeglass holder 10 showing the frame end 23 of an eyeglass 20 temple 22 inserted through one of the voids inside the front body structure 1 with the temple 22 hanging vertically down from the holder 10 and the eyeglass ophthalmic lens frame suspended vertically in front of the crescent shaped front body structure 1.

The foregoing description of the invention through its figures and preferred embodiment (s) should not be construed to limit the scope of the invention. It is to be understood that the embodiment (s) of the present invention as described herein do not limit any application or scope of the invention and that the invention can be carried out and practiced in various ways and implemented in embodiments other than the ones outlined in the description above. It should be understood and obvious to one skilled in the art that alternatives, modifications, and variations of the embodiments of the present invention may be construed as being within the spirit and scope of the appended claims.

What is claimed is:

1. An eyeglass holder device for supporting multiple eyeglasses, said holder device comprising:

a substantially crescent shaped front body structure;

a substantially rectangular shaped back structure;

said substantially crescent shaped front body structure forming an arm to suspend a plurality of eyeglasses from said eyeglass holder device;

said substantially crescent shaped front body structure having a plurality of substantially concave shaped rib structures attached to an inside surface of said substantially crescent shaped said substantially concave shaped rib structures face inwardly to the rectangular shaped back structure front body structure;

wherein said rib structures create a plurality of voids between said rib structures to hold a plurality of eyeglass temple bars between said plurality of rib structures and suspend a plurality of eyeglasses from said front of said substantially crescent shaped front body structure; and said substantially rectangular shaped back structure having a recessed back adapted to receive a double sided adhesive tape to mount said eyeglass holder device to a surface.

2. The eyeglass holder according to claim 1 wherein said plurality of substantially concave shaped rib structures are thin and flexible and function to deflect and exert tension on the eyeglasses and help in keeping the eyeglass temples stable within the voids to prevent the eyeglasses from moving around and getting damaged.

3. The eyeglass holder of claim 1 wherein said rib structures are of different lengths progressing from short length ribs at the front of the holder to large length ribs towards the back of the holder creating different sizes of voids to hold different sizes of eyeglasses.

4. The eyeglass holder of claim 1 wherein the rib structures are six or more in number to create eight or more voids to hold multiple numbers of eyeglasses on the holder device.

5. The eyeglass holder according to claim 1 wherein the eyeglass holder device holds reading glasses, sunglasses and protective eyewear used in a laboratory or workshop.

6. The eyeglass holder according to claim 1 wherein said eyeglass holder can be used to hold multiple eyeglasses in a vehicle, boat, workshop, laboratory, in a closet or any wall in a house or other structures.

7. The eyeglass holder of claim 1 wherein the eyeglass holder device is injection molded from plastic to form a single product.

\* \* \* \* \*